Aug. 18, 1925.
E. D. SWISHER
1,550,122
HEAT INDICATOR ALARM
Filed Aug. 22, 1921
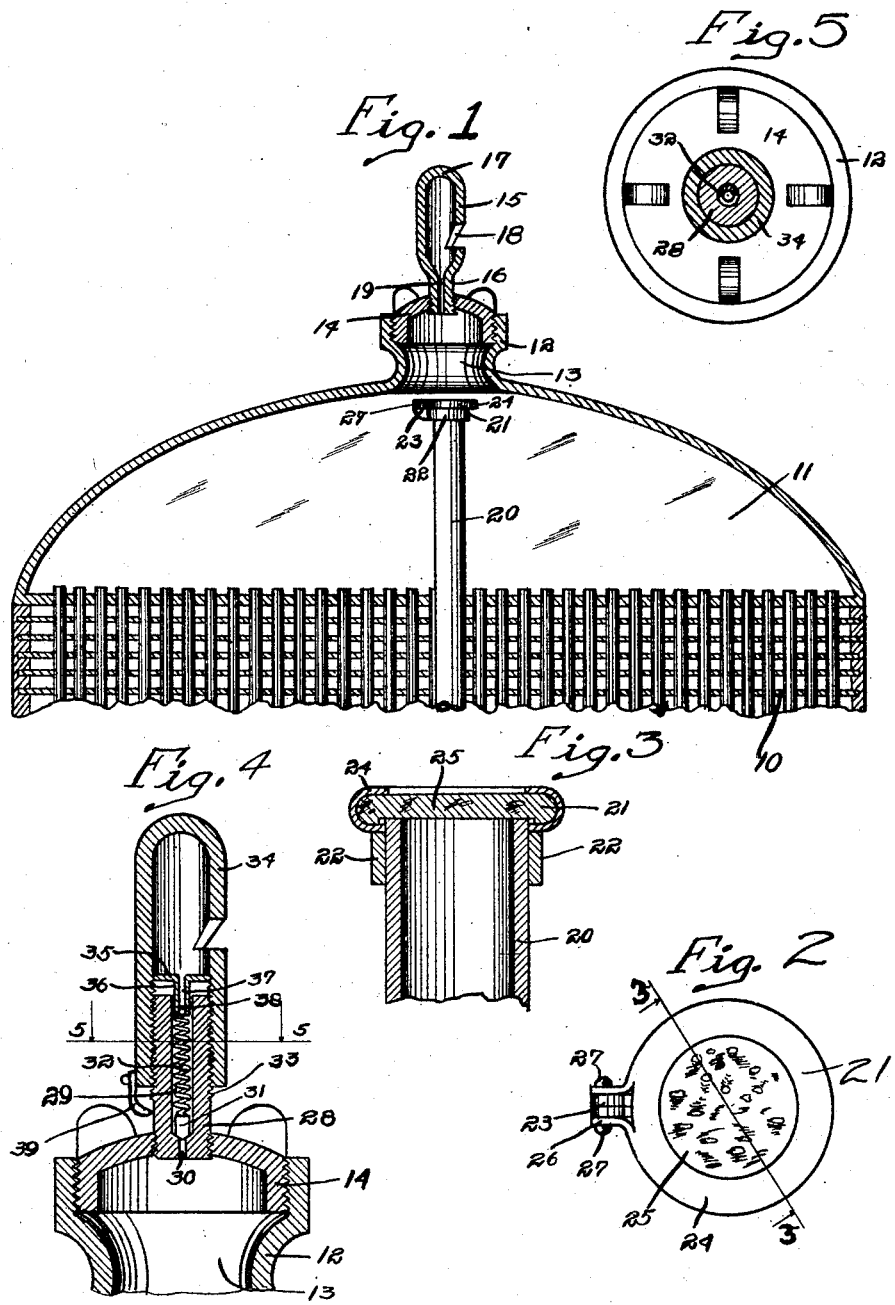
Witness
Fred Latta
Inventor
Earl D. Swisher
By Baird&Freeman
Attorneys Patented Aug. 18, 1925.

1,550,122

UNITED STATES PATENT OFFICE.

EARL D. SWISHER, OF DES MOINES, IOWA.

HEAT-INDICATOR ALARM.

Application filed August 22, 1921. Serial No. 494,152.

*To all whom it may concern:*

Be it known that I, EARL D. SWISHER, a citizen of the United States, residing at Des Moines, in the county of Polk and State of Iowa, have invented a certain new and useful Heat-Indicator Alarm, of which the following is a specification.

The object of my invention is to provide a heat indicator of simple, durable and inexpensive construction which will indicate to the driver of a car when the engine has become overheated.

More particularly my object is to provide such an indicator in the form of a steam whistle which shall be operated by steam coming from the overheated water in the radiator.

A further object is to provide with such a whistle a valve for closing the top of the overflow pipe in a radiator in order to retain the steam pressure, but which will open to allow the escape of water when the water reaches the level of the valve.

A further object is to provide such an indicator device having an adjustable valve in the whistle for permitting the operation of the whistle at very low or very high pressures.

With these and other objects in view my invention consists in the construction, arrangement and combination of the various parts of my device, whereby the objects contemplated are attained as hereinafter more fully set forth, pointed out in my claim, and illustrated in the accompanying drawings, in which:

Figure 1 is a vertical longitudinal, sectional view through the upper portion of a radiator having my improved alarm device installed in the radiator cap thereof.

Figure 2 is a plan view of the valve for closing the opening in the overflow tube.

Figure 3 is a vertical, sectional view through the same taken on the line 3—3 of Figure 2.

Figure 4 is a vertical sectional view through a radiator cap with a slightly modified form of my device installed therein; and Figure 5 is a horizontal, sectional view taken on the line 5—5 of Figure 4.

It is a well known fact that in many cars it is necessary to keep the water in the radiators below the boiling point, otherwise the engine will be seriously harmed. The temperature to which an engine may be subjected without injury varies in different cars, but in most cases the danger point is the boiling point of water.

I am aware of the fact that there are instruments of this kind already in use to indicate the state of temperature of an engine, but they use the principle of an ordinary thermometer, and in order to keep aware of the condition of the engine while driving, it is necessary to look at the instrument frequently.

It is very obvious that the driver of a car could forget to watch the instrument and thus allow his engine to become overheated. Again, the instrument is so far from the driver's seat that it is difficult to determine with accuracy when the danger point is being registered.

I have therefore provided a heat indicator alarm device which sounds a warning in the form of a shrill whistling, which will not fail to notify the driver, since it requires no attention on his part to receive the signal.

In Figure 1 I have shown a radiator 10 surmounted by the radiator tank 11, which has a raised neck 12 in which is a screw threaded opening 13. The radiator cap 14 is screwed into the opening 13.

In the form of the device here illustrated I have shown a whistle 15 having a restricted neck 16, the lower portion of which is screw threaded and adapted to be screwed into a screw threaded opening in the center of the cap 14. The interior of the whistle is hollow and closed at the upper end at 17, and has a vent 18 to allow the escape of steam and form the sound. A restricted opening 19 in the neck 16 allows the entrance of the steam to the whistle and allows the whistle to operate on a small amount of steam.

The radiator has a water overflow tube 20 which extends practically to the top of the tank 11. In order to prevent the steam escaping down through this tube, I have provided a closure device 21 for the top which will not interfere with the overflowing of the water in the tank when it reaches the level of the top of the tube.

The closure member 21 includes a ferrule 22 encircling the top of the tube having an upwardly extending lug 23. A cover member comprising a casing 24 in the form of a ring and having a cork disk 25 received therein, is hinged to the tube 20 by means of outwardly extending ears 26 which are adapted to receive between them the lug 23 and be pivoted thereto by a pintle 27.

When the water reaches the top of the tube 20 it causes the cover member to raise by means of the cork float 25, thus permitting the escape of the superfluous water down the tube, when closed it allows the steam to collect for blowing the whistle 15.

In Figure 4 I have shown a slightly modified form of the device wherein the whistle is formed in two parts. A neck 28 is screwed into the cap 14. In the neck 28 is an opening 29 having a reduced portion 30 at the lower portion thereof, forming a shoulder against which a valve slug 31 rests. A spring 32 in the opening 29 engages the slug 31. The neck 28 has its upper portion screw threaded as at 33 for receiving the screw threaded interior of the whistle member 34.

The member 34 has a partition 35 having a downwardly extending neck 36 with an opening 37. The spring 32 is fastened to the neck 36 at 38. By revolving the whistle 34 the neck 36 forces down the spring 32 against the slug 31.

It will be seen that by revolving the whistle member 34 the spring 32 will be tightened against the slug 31. The pressure at which the whistle will give the alarm may thus be regulated.

The advantage of this form is seen when it is considered that some cars may be run safely while the water is boiling moderately. In order to determine the point at which it is desired to set the valve, a finger 39 may be fastened to the lower edge of the member 34. Marks, not shown, encircle the neck 28 for coacting with the finger 39.

In the case of a car which is very sensitive to heat, the spring may be entirely raised from contact with the valve and the small amount of steam which would not operate the other form of the device will collect until sufficient to raise the light slug 31, when a short whistle will be emitted.

Some changes may be made in the construction and arrangement of the parts of my machine without departing from the real spirit and purpose of my invention, and it is my intention to cover by my claim, and modified forms of structure or use of mechanical equivalents, which may be reasonably included within its scope.

I claim as my invention:

In a radiator alarm structure, the combination of a radiator having in its upper portion a compartment and thereabove a whistle supported on said radiator in communication with said compartment, an overflow pipe having its intake end at the upper part of said compartment, and means for closing said pipe against the outflow of steam adapted to be opened by water rising to the level of said means.

EARL D. SWISHER.